(12) United States Patent
Fleck et al.

(10) Patent No.: US 11,781,683 B2
(45) Date of Patent: Oct. 10, 2023

(54) SHROUDED COUPLING

(71) Applicant: Victaulic Company, Easton, PA (US)

(72) Inventors: Michael Fleck, Easton, PA (US); Scott D. Madara, Nazareth, PA (US); Matthew A. Bowman, Palmer, PA (US)

(73) Assignee: VICTAULIC COMPANY, Easton, PA (US)

( * ) Notice: Subject to any disclaimer, the term of this patent is extended or adjusted under 35 U.S.C. 154(b) by 123 days.

(21) Appl. No.: 17/095,987

(22) Filed: Nov. 12, 2020

(65) Prior Publication Data
US 2021/0148494 A1   May 20, 2021

Related U.S. Application Data

(60) Provisional application No. 62/935,785, filed on Nov. 15, 2019.

(51) Int. Cl.
*F16L 19/02* (2006.01)
*F16L 17/04* (2006.01)

(52) U.S. Cl.
CPC ........... *F16L 19/0206* (2013.01); *F16L 17/04* (2013.01); *F16L 19/0218* (2013.01)

(58) Field of Classification Search
CPC ......... F16L 17/04; F16L 21/06; F16L 21/065; F16L 23/10; F16L 19/0218
See application file for complete search history.

(56) References Cited

U.S. PATENT DOCUMENTS

| | | |
|---|---|---|
| 1,020,123 A | 3/1912 | Brampton et al. |
| 1,074,395 A | 9/1913 | Welch |
| 1,203,989 A | 11/1916 | Dehn |
| 1,287,108 A | 12/1918 | Robinson et al. |
| 1,379,811 A | 5/1921 | Fyffe |
| 1,497,549 A | 6/1924 | Conradi |
| 1,633,913 A | 6/1927 | Wille |

(Continued)

FOREIGN PATENT DOCUMENTS

| | | |
|---|---|---|
| CN | 1221089 | 6/1999 |
| CN | 1959175 | 5/2007 |

(Continued)

OTHER PUBLICATIONS

Examiner Choi; Non-Final Office Action in U.S. Appl. No. 15/387,894, titled "Adapter Coupling"; dated Dec. 31, 2018; 13 pages.

(Continued)

*Primary Examiner* — David Bochna
(74) *Attorney, Agent, or Firm* — Ballard Spahr LLP

(57) ABSTRACT

Couplings for joining pipe elements have segments with attachment members with faces which contact one another when the segments are properly installed on the pipe elements. Each segment has one or more shrouds and recesses positioned along the faces. The shrouds on one segment are received within respective recesses on the other segment. The shrouds block the line of sight toward the central space which the segments surround and which receives the pipe elements. Index markings on the segments show visual inspection points to confirm proper engagement between the segments and the pipe elements.

29 Claims, 9 Drawing Sheets

(56) References Cited

U.S. PATENT DOCUMENTS

| | | |
|---|---|---|
| 1,831,641 A | 7/1927 | Skinner |
| 1,649,594 A | 11/1927 | Johnson |
| 1,770,271 A | 7/1930 | Hoppes |
| 1,834,968 A | 12/1931 | Rector |
| 1,969,043 A | 8/1934 | Sham |
| 1,999,045 A | 4/1935 | goetz |
| 2,021,081 A | 11/1935 | Nagao |
| 2,021,082 A | 11/1935 | North |
| 2,067,428 A | 1/1937 | Wallis |
| 2,094,258 A | 9/1937 | Thompson |
| 2,128,720 A | 8/1938 | Tweedale |
| 2,225,208 A | 12/1940 | Crickmer |
| 2,412,394 A | 12/1946 | Giles |
| 2,426,423 A | 8/1947 | Woolsey |
| 2,459,251 A | 1/1949 | Stillwagon |
| 2,463,235 A | 3/1949 | Andrews |
| 2,491,004 A | 12/1949 | Graham |
| 2,635,901 A | 4/1953 | Osborn |
| 2,761,709 A | 9/1956 | Gilbert, Sr. |
| 2,775,806 A | 1/1957 | Love |
| 2,926,028 A | 2/1960 | Hookings et al. |
| 2,958,546 A | 11/1960 | Lee |
| 3,014,259 A | 12/1961 | Louis |
| 3,054,629 A | 9/1962 | Piatek |
| 3,084,959 A | 4/1963 | Stanton |
| 3,116,078 A | 12/1963 | Scherer |
| 3,142,502 A | 7/1964 | Luther |
| 3,148,896 A | 9/1964 | Chu |
| 3,153,550 A | 10/1964 | Hollett |
| 3,235,293 A | 2/1966 | Condon |
| 3,362,730 A | 1/1968 | Clair et al. |
| 3,414,297 A | 12/1968 | Pollia |
| 3,466,069 A | 9/1969 | Hoke et al. |
| 3,479,066 A | 11/1969 | Gittleman |
| 3,507,520 A | 4/1970 | Guldener et al. |
| 3,517,701 A | 6/1970 | Smith |
| 3,596,935 A | 8/1971 | McGeoch |
| 3,633,943 A | 1/1972 | Ramm et al. |
| 3,680,894 A | 8/1972 | Young |
| 3,768,819 A | 10/1973 | Burkert |
| 3,776,579 A | 12/1973 | Gale |
| 3,788,677 A | 1/1974 | Stade et al. |
| 3,794,360 A | 2/1974 | Bachle et al. |
| 3,825,286 A | 7/1974 | Henry, III |
| 3,861,723 A | 1/1975 | Kunz et al. |
| 3,920,270 A | 11/1975 | Babb, Jr. |
| 3,944,260 A | 3/1976 | Petroczky |
| 4,018,979 A | 4/1977 | Young |
| 4,073,514 A | 2/1978 | Pate |
| 4,119,333 A | 10/1978 | Straub |
| 4,123,090 A | 10/1978 | Kotsakis et al. |
| 4,183,555 A | 1/1980 | Martin |
| 4,225,160 A | 9/1980 | Ortloff |
| 4,249,786 A | 2/1981 | Mahoff |
| 4,273,367 A | 6/1981 | Keeney et al. |
| 4,284,298 A | 8/1981 | Kaufmann, Jr. |
| 4,326,737 A | 4/1982 | Lehmann |
| 4,372,587 A | 2/1983 | Roche |
| 4,408,788 A | 10/1983 | Beukema |
| 4,443,029 A | 4/1984 | Laxo |
| 4,461,498 A | 7/1984 | Kunsman |
| 4,471,979 A | 9/1984 | Gibb et al. |
| 4,522,434 A | 6/1985 | Webb |
| 4,568,112 A | 2/1986 | Bradley, Jr. et al. |
| 4,610,471 A | 9/1986 | Rung et al. |
| 4,611,839 A | 9/1986 | Rung et al. |
| 4,629,217 A | 12/1986 | Straub |
| 4,633,913 A | 1/1987 | Carty et al. |
| 4,639,016 A | 1/1987 | Rogers |
| 4,639,020 A | 1/1987 | Rung et al. |
| 4,652,023 A | 3/1987 | Timmons |
| 4,664,422 A | 5/1987 | Straub |
| 4,678,208 A | 7/1987 | DeRaymond |
| 4,702,499 A | 10/1987 | deRaymond et al. |
| 4,792,160 A | 12/1988 | Hwang |
| 4,819,974 A | 4/1989 | Zeidler |
| 4,838,584 A | 6/1989 | Dierksmeier |
| 4,842,306 A | 6/1989 | Zeidler et al. |
| 4,861,075 A | 8/1989 | Pepi et al. |
| 4,893,843 A | 1/1990 | DeRaymond |
| 4,896,902 A | 1/1990 | Weston |
| 4,898,407 A | 2/1990 | Zeidler |
| 5,018,768 A | 5/1991 | Palatchy |
| 5,022,685 A | 6/1991 | Stiskin et al. |
| 5,080,400 A | 1/1992 | Adamek |
| 5,121,946 A | 6/1992 | Jardine |
| 5,137,305 A | 8/1992 | Straub |
| 5,161,836 A | 11/1992 | McKinnon |
| 5,203,594 A | 4/1993 | Straub |
| 5,230,537 A | 7/1993 | Newman |
| 5,273,322 A | 12/1993 | Straub |
| 5,280,970 A | 1/1994 | Straub |
| 5,354,108 A | 10/1994 | Sandor |
| 5,437,482 A | 8/1995 | Curtis |
| 5,452,922 A | 9/1995 | Ziu |
| 5,603,350 A | 2/1997 | Stoll et al. |
| 5,605,865 A | 2/1997 | Maniar et al. |
| 5,641,118 A | 6/1997 | Harth |
| 5,675,873 A | 10/1997 | Groess |
| 5,681,062 A | 10/1997 | Fukao et al. |
| 5,713,607 A | 2/1998 | Webb |
| 5,722,702 A | 3/1998 | Washburn |
| 5,758,907 A | 6/1998 | Dole et al. |
| 5,769,467 A | 6/1998 | Bridges |
| 5,772,257 A | 6/1998 | Webb et al. |
| 5,782,499 A | 7/1998 | Gfrer et al. |
| 5,786,054 A | 7/1998 | Platusich et al. |
| 5,813,437 A | 9/1998 | Esser |
| 5,911,446 A | 6/1999 | McLennan et al. |
| 5,961,154 A | 10/1999 | Williams et al. |
| 6,030,006 A | 2/2000 | Lin |
| 6,056,332 A | 5/2000 | Foster |
| 6,065,784 A | 5/2000 | Lundstrom |
| 6,070,911 A | 6/2000 | Namikawa |
| 6,076,861 A * | 6/2000 | Ikeda ............... F16L 17/04 |
| | | 285/112 |
| 6,131,957 A | 10/2000 | Saito |
| 6,170,884 B1 | 1/2001 | McLennan |
| 6,276,726 B1 | 8/2001 | Daspit |
| 6,276,729 B1 | 8/2001 | Sanwald et al. |
| 6,305,719 B1 | 10/2001 | Smith, Jr. et al. |
| 6,328,352 B1 | 12/2001 | Geppert et al. |
| 6,367,849 B1 | 4/2002 | Tatsuta et al. |
| 6,450,551 B1 | 9/2002 | Lee |
| 6,499,771 B1 | 12/2002 | Snyder, Sr. et al. |
| 6,502,865 B1 | 1/2003 | Steele |
| 6,505,865 B2 | 1/2003 | Minemyer |
| 6,626,456 B2 | 9/2003 | Terbu et al. |
| 6,626,466 B1 | 9/2003 | Dole |
| 6,672,631 B1 | 1/2004 | Weinhold |
| 6,749,232 B2 | 6/2004 | Wachter |
| 6,921,115 B2 | 7/2005 | Gill |
| 7,070,209 B2 | 7/2006 | Collins |
| 7,086,131 B2 | 8/2006 | Gibb et al. |
| 7,090,259 B2 | 8/2006 | Dole |
| 7,341,287 B2 | 3/2008 | Gibb et al. |
| 7,434,846 B2 | 10/2008 | Baumgartner |
| 7,490,866 B2 | 2/2009 | Webb et al. |
| 7,500,699 B2 | 3/2009 | Snyder, Sr. et al. |
| 7,523,963 B2 | 4/2009 | Draper |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 | 6/2010 | Porter et al. |
| 7,789,434 B2 | 9/2010 | Nagle et al. |
| 7,798,535 B2 | 9/2010 | Calhoun |
| 7,841,630 B1 | 11/2010 | Auray et al. |
| 7,861,982 B1 | 1/2011 | McClure |
| 7,891,713 B2 | 2/2011 | Bekkevold |
| 7,921,536 B2 | 4/2011 | Dole |
| 7,988,207 B2 | 8/2011 | Dole et al. |
| 7,996,981 B2 | 8/2011 | Dole et al. |
| 8,136,847 B2 | 3/2012 | Madara et al. |
| 8,424,179 B2 | 4/2013 | Webb et al. |

(56) References Cited

U.S. PATENT DOCUMENTS

| | | |
|---|---|---|
| 8,517,430 B2 | 8/2013 | Dole et al. |
| 8,777,277 B2 | 7/2014 | Dole et al. |
| 8,820,795 B2 | 9/2014 | Dole |
| 8,827,214 B2 | 9/2014 | Ogawa |
| 9,151,422 B2 | 10/2015 | Kayacik et al. |
| 9,169,952 B2 * | 10/2015 | Horgan .................. F16L 23/10 |
| 9,285,061 B2 * | 3/2016 | Ikeda ..................... F16L 17/04 |
| 9,482,374 B2 | 11/2016 | Henry |
| 9,791,083 B2 | 10/2017 | Gibb |
| 9,890,884 B1 | 2/2018 | Chiproot |
| 9,976,677 B2 | 5/2018 | Lurk |
| 10,408,368 B2 | 9/2019 | Bancroft et al. |
| 10,451,205 B2 * | 10/2019 | Motoyama ............. F16L 23/08 |
| 10,458,579 B2 | 10/2019 | Bowman et al. |
| 10,627,025 B2 | 4/2020 | Bowman et al. |
| 10,641,421 B2 | 5/2020 | Beagen, Jr. |
| 10,661,488 B2 | 5/2020 | French et al. |
| 10,704,511 B2 | 7/2020 | Williams et al. |
| 10,731,776 B2 | 8/2020 | Ciasulli et al. |
| 10,735,780 B2 | 8/2020 | Bowman et al. |
| 10,859,190 B2 | 12/2020 | Bowman et al. |
| 10,883,636 B2 | 1/2021 | Schilling et al. |
| 10,890,283 B2 | 1/2021 | Surjaatmadja |
| 10,962,159 B2 | 3/2021 | Kujawski, Jr. |
| 2002/0135184 A1 | 9/2002 | Snyder, Sr. et al. |
| 2002/0185868 A1 | 12/2002 | Snyder, Sr. et al. |
| 2002/0195820 A1 | 12/2002 | Surjaatmadja |
| 2003/0020276 A1 | 1/2003 | Steele |
| 2004/0080157 A1 | 4/2004 | Borgmeier et al. |
| 2004/0237632 A1 | 12/2004 | Van Keeken |
| 2005/0001428 A1 | 1/2005 | Scherrer |
| 2005/0028366 A1 | 2/2005 | Bien et al. |
| 2005/0067538 A1 | 3/2005 | Stigler |
| 2005/0082831 A1 * | 4/2005 | Borland .................. F16L 21/04 |
| | | 285/369 |
| 2005/0212284 A1 | 9/2005 | Dole |
| 2005/0253029 A1 | 11/2005 | Gibb |
| 2005/0253380 A1 | 11/2005 | Gibb et al. |
| 2006/0087121 A1 | 4/2006 | Bradley |
| 2006/0103136 A1 | 5/2006 | Krengel |
| 2006/0138776 A1 | 6/2006 | Amedure et al. |
| 2006/0214422 A1 | 9/2006 | Cuvo et al. |
| 2007/0024056 A1 | 2/2007 | Borland |
| 2007/0090646 A1 | 4/2007 | Dole et al. |
| 2007/0296213 A1 | 12/2007 | Jones et al. |
| 2008/0007061 A1 | 1/2008 | Gibb |
| 2008/0054636 A1 | 3/2008 | Reid |
| 2008/0093847 A1 | 4/2008 | Sundholm |
| 2008/0129048 A1 | 6/2008 | Nagle et al. |
| 2008/0197627 A1 | 8/2008 | Baudoin et al. |
| 2008/0265568 A1 | 10/2008 | Bekkevold |
| 2008/0272595 A1 | 11/2008 | Gibb et al. |
| 2008/0284161 A1 | 11/2008 | Dole et al. |
| 2009/0127846 A1 | 5/2009 | Dole et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0115733 A1 | 5/2010 | Bouchiat |
| 2010/0148493 A1 | 6/2010 | Madara et al. |
| 2010/0197627 A1 | 8/2010 | Baudoin et al. |
| 2010/0296925 A1 | 11/2010 | Sakai |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0025524 A1 | 2/2012 | Krausz et al. |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 | 10/2012 | Dole |
| 2012/0256418 A1 | 10/2012 | Horgan |
| 2012/0306118 A1 | 12/2012 | Hayashyi et al. |
| 2012/0306198 A1 | 12/2012 | McDonald |
| 2013/0125373 A1 | 5/2013 | Bancroft |
| 2013/0127160 A1 | 5/2013 | Bancroft et al. |
| 2013/0181446 A1 | 7/2013 | Le Clinche |
| 2013/0319568 A1 | 12/2013 | Daugherty et al. |
| 2013/0327415 A1 | 12/2013 | Camp, Jr. et al. |
| 2014/0070529 A1 | 3/2014 | Bancroft et al. |
| 2014/0239633 A1 | 8/2014 | Swingley |
| 2014/0327238 A1 | 11/2014 | Bowman |
| 2015/0001846 A1 | 1/2015 | Griffin |
| 2015/0021911 A1 | 1/2015 | Bowman et al. |
| 2015/0176728 A1 | 6/2015 | Bowman |
| 2015/0204471 A1 * | 7/2015 | Sato ....................... F16L 33/04 |
| | | 24/284 |
| 2016/0084420 A1 | 3/2016 | Barrientos |
| 2017/0184226 A1 | 6/2017 | Cuvo et al. |
| 2017/0328500 A1 * | 11/2017 | Bowman ................ F16L 17/04 |
| 2017/0328507 A1 | 11/2017 | Sith et al. |
| 2018/0163905 A1 | 6/2018 | Ohnemus et al. |
| 2018/0163906 A1 | 6/2018 | Ohnemus et al. |
| 2018/0200550 A1 | 7/2018 | Bancroft et al. |
| 2018/0216754 A1 * | 8/2018 | Ciasulli ................. F16L 23/08 |
| 2019/0032824 A1 | 1/2019 | McNamara et al. |
| 2019/0032825 A1 | 1/2019 | McNamara et al. |
| 2020/0088327 A1 * | 3/2020 | Lippka .................. F16L 17/04 |
| 2020/0088329 A1 | 3/2020 | Madara |
| 2020/0088330 A1 | 3/2020 | Lippka |
| 2020/0208765 A1 | 7/2020 | Kishi et al. |
| 2020/0232586 A1 | 7/2020 | Luers |
| 2020/0263818 A1 | 8/2020 | Prince |
| 2020/0292110 A1 | 9/2020 | Bunn, Sr. |
| 2020/0408339 A1 | 12/2020 | Tan et al. |
| 2021/0071794 A1 | 3/2021 | Chan et al. |
| 2021/0095797 A1 * | 4/2021 | Marakovits ............ F16L 17/04 |
| 2021/0108747 A1 | 4/2021 | Iida et al. |

FOREIGN PATENT DOCUMENTS

| | | |
|---|---|---|
| CN | 101886721 | 11/2010 |
| CN | 102345774 | 2/2012 |
| CN | 102933886 | 2/2013 |
| CN | 204204640 | 12/2014 |
| CN | 105423015 | 3/2016 |
| CN | 105473923 | 4/2016 |
| DE | 669605 | 12/1938 |
| DE | 3111997 | 10/1982 |
| DE | 3443942 | 6/1985 |
| DE | 3443943 | 6/1985 |
| DE | 19532356 | 4/1996 |
| DE | 10006029 | 8/2001 |
| DE | 202012011293 | 1/2013 |
| EP | 0462454 | 12/1991 |
| EP | 2112414 | 10/2009 |
| EP | 2113701 | 11/2009 |
| EP | 1840439 | 6/2010 |
| EP | 2487397 | 8/2012 |
| ER | 2921985 | 3/2013 |
| FR | 1201165 | 12/1959 |
| FR | 2683017 | 4/1993 |
| FR | 2685057 | 6/1993 |
| FR | 2747453 | 4/1997 |
| GB | 1499346 | 2/1978 |
| GB | 2098297 | 11/1982 |
| GB | 2211255 | 8/1989 |
| JP | S52126317 | 3/1951 |
| JP | 59004228 | 7/1979 |
| JP | S5615891 | 2/1981 |
| JP | 5615891 | 2/1984 |
| JP | S524772 | 2/1993 |
| JP | 6147362 | 5/1994 |
| JP | 07269764 | 10/1995 |
| JP | 2001304468 | 10/2001 |
| JP | 2002147664 | 5/2002 |
| JP | 2006250247 | 9/2006 |
| JP | 2007537414 | 12/2007 |
| JP | 2008202791 | 9/2008 |
| JP | 2009167971 | 7/2009 |
| JP | 2011163474 | 8/2011 |
| JP | 2012026578 | 2/2012 |

(56) References Cited

FOREIGN PATENT DOCUMENTS

| JP | 2012189147 | 10/2012 |
|---|---|---|
| JP | 2013542382 | 11/2013 |
| JP | 2014001848 | 1/2014 |
| KR | 100315861 | 11/2001 |
| KR | 20090007813 | 1/2009 |
| KR | 100904419 | 6/2009 |
| KR | 20090066767 | 6/2009 |
| WO | 199703811 | 2/1997 |
| WO | 2005114023 | 12/2005 |
| WO | 2008144302 | 11/2008 |
| WO | 2013077966 | 5/2013 |
| WO | 2013115963 | 8/2013 |

OTHER PUBLICATIONS

Examiner Choi; Final Office Action in U.S. Appl. No. 15/387,894, titled "Adapter Coupling", dated Jun. 13, 2019; 13 pages.
Examiner Choi; Non-Final Office Action in U.S. Appl. No. 15/387,894, titled "Adapter Coupling"; dated Jan. 13, 2021; 13 pages.
Examiner Ford; Non- Final Office Action in U.S. Appl. No. 16/413,726, titled "Adapter Coupling"; dated Jan. 8, 2020; 13 pages.
Examiner Ford; Final Office Action in U.S. Appl. No. 16/413,726, titled "Adapter Coupling"; dated Apr. 15, 2020; 19 pages.
Examiner Ford; Non-Final Office Action in U.S. Appl. No. 16/413,726, titled "Adapter Coupling"; dated Feb. 3, 2021; 17 pages.

\* cited by examiner

SHROUDED COUPLING

CROSS REFERENCE TO RELATED APPLICATIONS

This application is based upon and claims benefit of priority to U.S. Provisional Application No. 62/935,785, filed Nov. 15, 2019, which application is hereby incorporated by reference.

FIELD OF THE INVENTION

This invention relates to couplings for joining pipe elements

BACKGROUND

This invention concerns segmented mechanical couplings which have arcuate projections, known as keys, which engage grooves in pipe elements in order to mechanically couple those pipe elements in end to end relationship, and which further have a sealing element which ensures the leak tightness of the mechanical joint provided by the coupling. Such couplings comprise segments which have bolting lugs, and bolt and nut assemblies are disposed within through holes in those lugs. These couplings are typically assembled by tightening of the bolts, which bring the segments toward one another, compressing the seal and bringing the inner faces of the segments, in particular, the faces on the lugs, to bear against one another, with the abutting contact between those inner faces serving as a "stop" which signals to the installer that the coupling is fully assembled when no visual gap between the faces remains. This visual gap is particularly noticeable at the inboard of the fasteners where the gasket may be visualized through the gap. While this planar face-to-face state may often signal appropriate tightening of the bolt, there are some conditions under which it is desirable or unavoidable for a coupling to be fully and properly assembled in a condition such that the inner faces of the segments are in partial or line contact, but are not fully in planar face to face contact. Such conditions may be unavoidable such as when pipe that is grooved incorrectly, is out of round, or out of specification; or such conditions may be desirable, such as when it is intended that the keys firmly engage and deform about the pipe element in all cases, requiring that some tolerance exist on the gap between the bolting faces such that they may not be able to reach planar face-to-face contact. In either of such conditions, it is preferable that the installer not misuse the coupling by continuing to tighten the bolts to attempt to achieve planar face-to-face contact as such excessive tightening may create unintended high stresses within the bolt and nut assemblies. The propensity to create high stresses in the bolt and nut assemblies may be exacerbated by the common availability of battery powered impact wrenches that can apply very high torque to the nut and bolt assemblies but with very little physical feedback to the installer of the torque that is being achieved (in contrast to a simple wrench that provides the installer a direct indication of the amount of toque they are applying). Thus, it is desirable to improve mechanical couplings such that an installer will be provided with a visual indication of tightening that removes the ability to see the gasket between the bolting lugs, even in conditions that are not fully planar face to face contact of the inner faces of the lugs.

SUMMARY

The invention concerns a coupling for joining pipe elements in end to end relation. An example embodiment of a coupling according to the invention comprises first and second segments attached to one another end to end surrounding a central space for receiving the pipe elements. A first attachment member extends from a first end of the first segment. The first attachment member defines a first face. A second attachment member extends from a first end of the second segment. The second attachment member defines a second face. The first and second faces are in facing relation. A first shroud is positioned on the first attachment member and extends along at least a portion of the first face. The first shroud projects toward the second attachment member. A first recess is positioned on the second attachment member and extends along at least a portion of the second face. The first recess receives the first shroud when the first and second attachment members are drawn toward one another. An adjustable first fastener extending between the first and second attachment members for drawing the first and second attachment members toward one another.

An example coupling may further comprise a second shroud positioned on the second attachment member. The second shroud extends along at least a portion of the second face. The second shroud projects toward the first attachment member. A second recess is positioned on the first attachment member and extending along at least a portion of the first face. The second recess receives the second shroud when the first and second attachment members are drawn toward one another. By way of example the second shroud is positioned on an opposite side of the second attachment member from the first recess and the second recess is positioned on an opposite side of the first attachment member from the first shroud.

In an example embodiment a third attachment member extends from a second end of the first segment. The third attachment member defines a third face. A fourth attachment member extends from a second end of the second segment. The fourth attachment member defines a fourth face. The third and fourth faces are in facing relation. A third shroud is positioned on the third attachment member and extends along at least a portion of the third face. The third shroud projects toward the fourth attachment member. A third recess is positioned on the fourth attachment member and extends along at least a portion of the fourth face. The third recess receives the third shroud when the third and fourth attachment members are drawn toward one another. An adjustable second fastener extends between the third and fourth attachment members for drawing the third and fourth attachment members toward one another.

In a further example a fourth shroud is positioned on the fourth attachment member. The fourth shroud extends along at least a portion of the fourth face. The fourth shroud projects toward the third attachment member. The fourth recess is positioned on the third attachment member and extends along at least a portion of the third face. The fourth recess receives the fourth shroud when the third and fourth attachment members are drawn toward one another.

By way of example the third shroud is positioned on an opposite side of the third attachment member from the fourth recess and the fourth shroud is positioned on an opposite side of the fourth attachment member from the third recess. A further example embodiment according to the invention comprises a hinge positioned at a second end of each of the first and second segments. The first and second segments pivot about the hinge when the first and second segments are drawn toward one another. In an example embodiment a second shroud is positioned on the second attachment member. The second shroud extends along at least a portion of the second face. The second shroud projects toward the first attachment member. A second recess is positioned on the first attachment member and extends along at least a portion of the first face. The second recess receive the second shroud when the first and second attachment members are drawn toward one another. In an example embodiment the second shroud is positioned on an opposite side of the second attachment member from the first recess and the second recess is positioned on an opposite side of the first attachment member from the first shroud.

By way of example the hinge comprises a first boss projecting from the second end of the first segment. A second boss projects from the second end of the second segment and is positioned adjacent to the first boss. A first fulcrum is positioned on the first boss and contacts the second boss. The segments pivot about the first fulcrum. A link extends between and captures the first and second bosses. An example embodiment comprises a second fulcrum positioned on the second boss. The second fulcrum contacts the first fulcrum. By way of example, a first land is positioned contiguous with the first fulcrum on the first boss and a second land is positioned contiguous with the second fulcrum on the second boss. The first and second lands are oriented angularly with respect to a plane defining an interface between the first and second segments. Further by way of example, a first head projects from the first boss and a second head projects from the second boss. The link engages the first and second heads for retaining the link to the bosses. In an example embodiment the link comprises a ring encircling the first and second bosses.

In an example embodiment according to the invention the first attachment member comprises a first lug defining a first hole for receiving the first fastener and the second attachment member comprises a second lug defining a second hole for receiving the first fastener. In a specific example a portion of the first face surrounds the first hole and a portion of the second face surrounds the second hole. In a further example embodiment the first attachment member comprises a first lug defining a first hole for receiving the first fastener, the second attachment member comprises a second lug defining a second hole for receiving the first fastener, the third attachment member comprises a third lug defining a third hole for receiving the second fastener and the fourth attachment member comprises a fourth lug defining a fourth hole for receiving the second fastener. A portion of the first face surrounds the first hole, a portion of the second face surrounds the second hole, a portion of the third face surrounds the third hole and a portion of the face surrounds the fourth hole in an example embodiment.

An example embodiment of a coupling according to the invention may further comprise a first index mark positioned on the first attachment member and a second index mark positioned on the second attachment member. The first and second index marks align with one another when the first and second segments are drawn toward one another. By way of example, the first and second index marks may be integrally formed with the first and second attachment members respectively. Additionally by way of example, a coupling according to the invention may comprise a first index mark positioned on the first attachment member, a second index mark positioned on the second attachment member, a third index mark positioned on the third attachment member and a fourth index mark positioned on the fourth attachment member. The first and second index marks align with one another, and the third and fourth index marks align with one another when the first and second segments are drawn toward one another in an example embodiment. In a particular example embodiment the first, second, third and fourth index marks are integrally formed with the first, second, third and fourth attachment members respectively.

An example embodiment may further comprise a first tooth positioned at the first end of the first segment. The first tooth projects toward the second segment. A first socket is positioned at the first end of the second segment. The first socket receives the first tooth when the first and second segments are drawn toward one another. Further by way of example, a second tooth may be positioned at the first end of the second segment. The second tooth projects toward the first segment. A second socket may be positioned at the first end of the first segment. The second socket receives the second tooth when the first and second segments are drawn toward one another.

In an example coupling embodiment each first and second segments comprises first and second arcuate projections on opposite sides of each segment. Each arcuate projection extends between the first and second ends of the segments. Each arcuate projection is engageable with one of the pipe elements when the first and second segments are drawn toward one another. An example embodiment further comprises a seal positioned between the segments. By way of example the seal may comprise a ring. The ring supports the first and second segments in space relation sufficient to insert the pipe elements into the central space. In a specific example embodiment the first fastener comprises a threaded bolt and nut.

DETAILED DESCRIPTION

Figure 1:
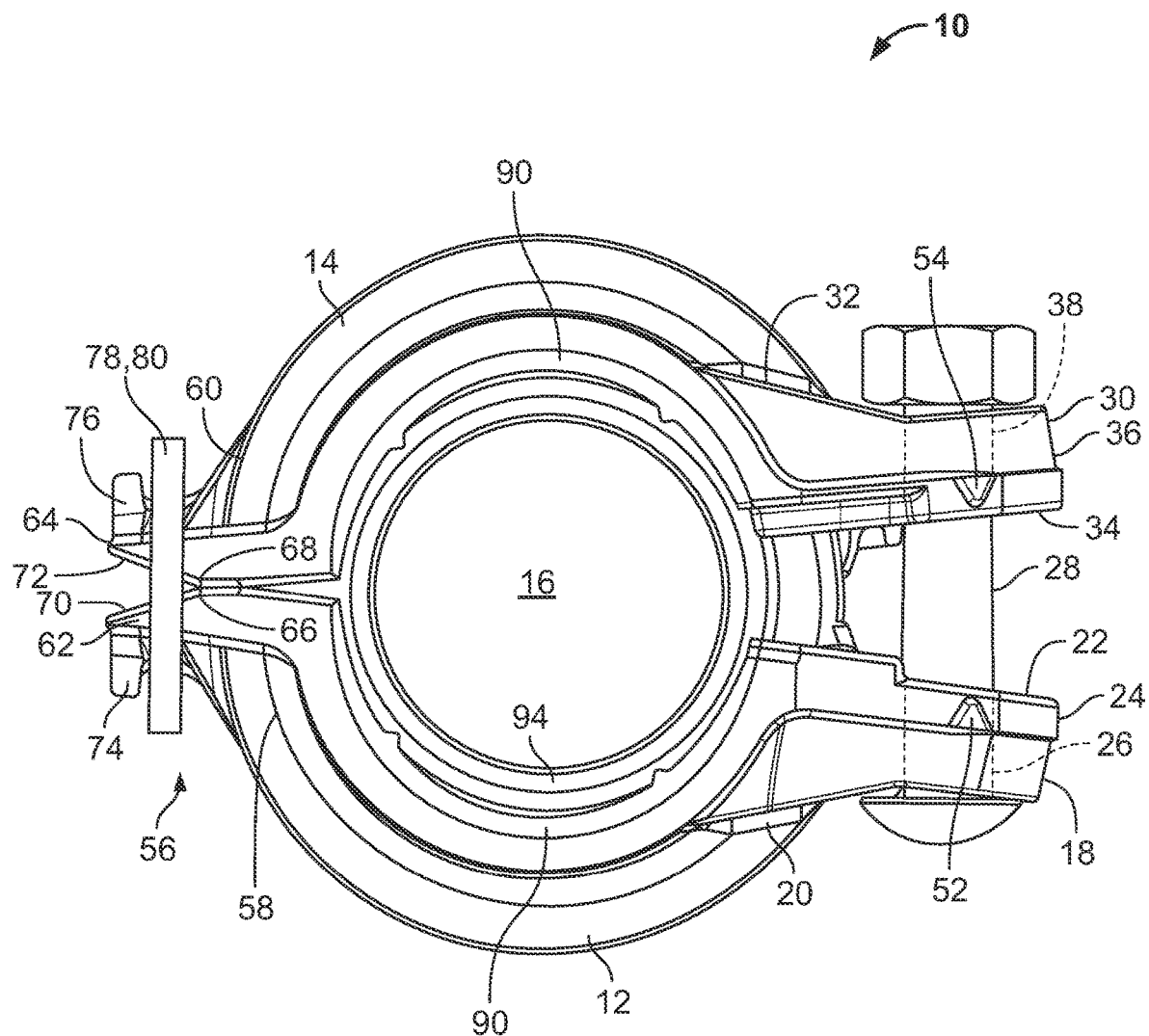
FIG. 1 is a side view of an example embodiment of a coupling according to the invention shown in a factory assembled configuration.
Figure 2:
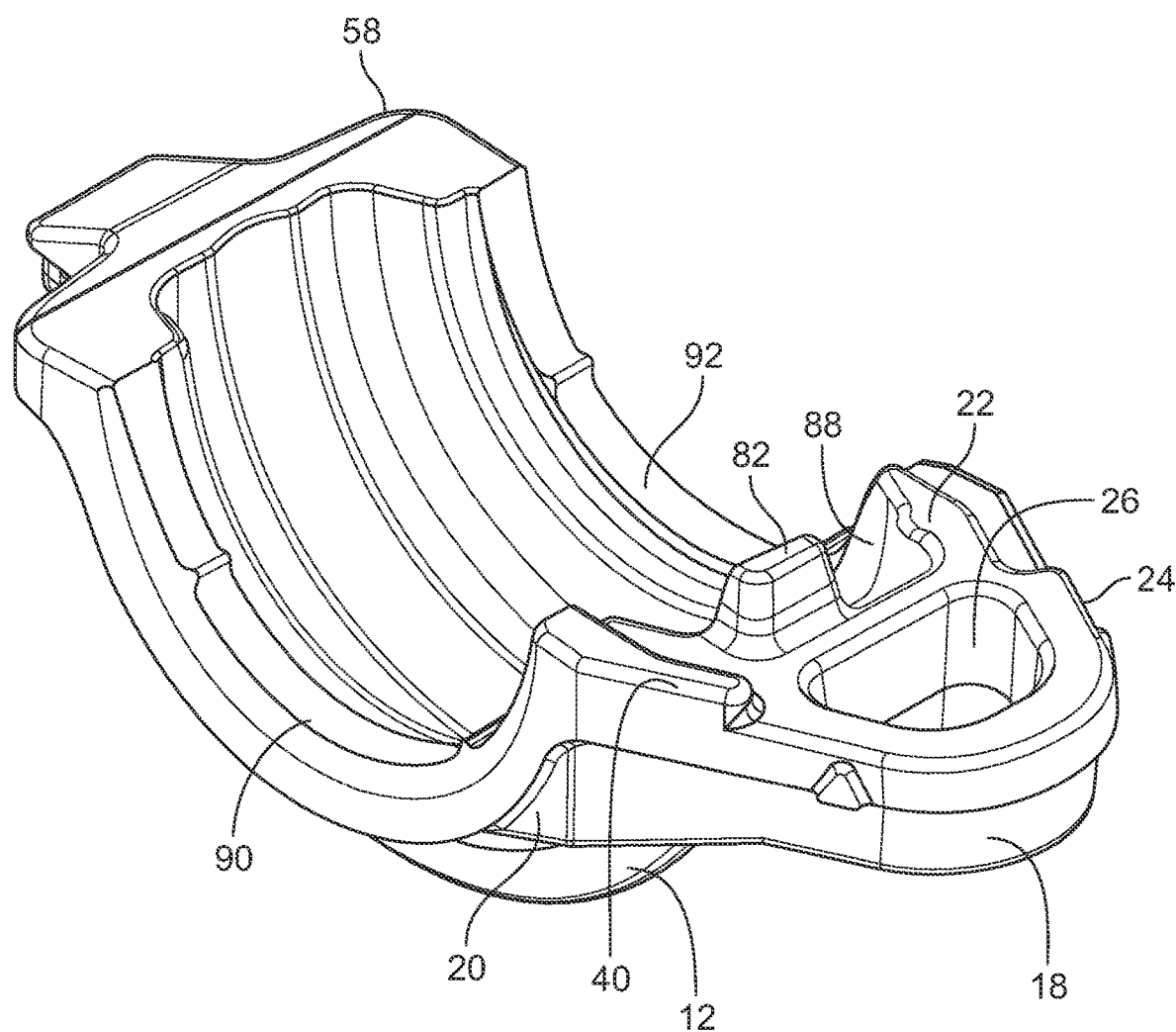
FIG. 2 is an isometric view of a component of the coupling shown in FIG. 1.

FIG. 1 shows an example coupling 10 for joining pipe elements (not shown) in end to end relation. Coupling 10 comprises first and second segments 12 and 14 attached to one another end to end surrounding a central space 16 for receiving the pipe elements. A first attachment member 18 extends from a first end 20 of the first segment 12. As shown in FIG. 2, attachment member 18 defines a first face 22. In this example embodiment the attachment member 18 comprises a first lug 24. Lug 24 defines a first hole 26 for receiving a first fastener 28 as shown in FIG. 1. A portion of the first face 22 surrounds the hole 26 in this embodiment.

As further shown in FIG. 1, a second attachment member 30 extends from a first end 32 of the second segment 14.

Second attachment member 30 defines a second face 34. The first and second attachment members 18 and 30 are arranged such that the first and second faces 22 and 34 are in facing relation with one another. Similar to the first attachment member, the second attachment member 30 comprises a second lug 36 which defines a second hole 38 for receiving the fastener 28. A portion of the second face 34 on second attachment member 30 surrounds the second hole 38.

Figure 3:
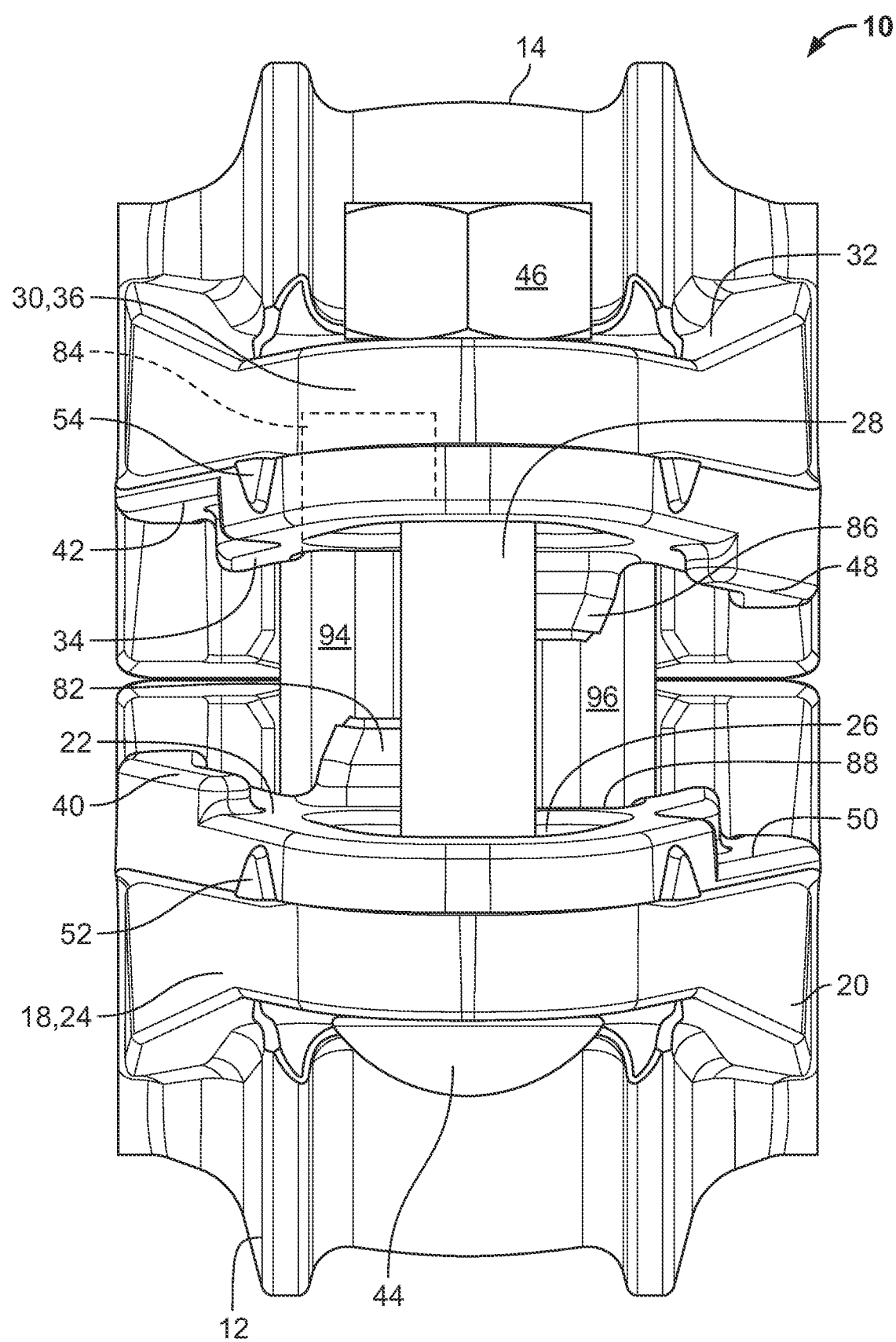
FIG. 3 is an end view of the coupling shown in FIG. 1.
Figure 4:
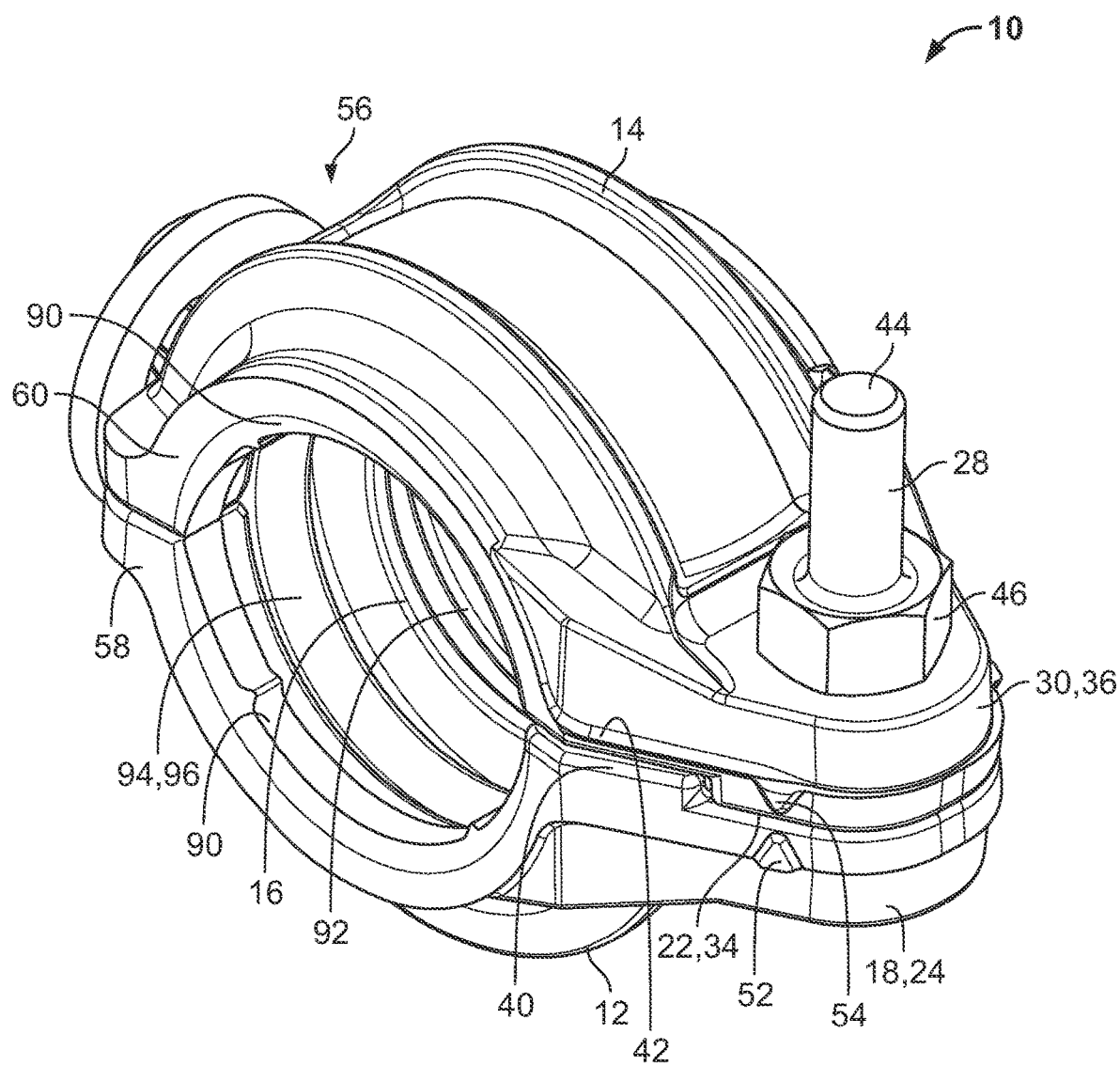
FIG. 4 is an isometric view of the coupling shown in FIG. 1 as it would appear when engaging pipe elements (not shown)

As shown in FIGS. 2 and 3, a first shroud 40 is positioned on the first attachment member 18. First shroud 40 extends along at least a portion of the first face 22. The first shroud projects toward the second attachment member 30. A first recess 42 is positioned on the second attachment member 30 and extends along at least a portion of the second face 34. As shown in FIG. 4, the first recess 42 receives the first shroud 40 when the first and second attachment members 18 and 30 are drawn toward one another to engage the pipe elements (not shown) and form a joint. In this example embodiment, fastener 28, comprising a threaded bolt 44 and nut 46, is adjustably tightenable to draw the attachment members 18 and 30 toward one another and into engagement as described below.

As shown in FIG. 3, a second shroud 48 is positioned on the second attachment member 30. Second shroud 48 extends along at least a portion of the second face 34 and projects toward the first attachment member 18. A second recess 50 is positioned on the first attachment member 18. Second recess 50 extends along at least a portion of the first face 22. The second recess 22 receives the second shroud 50 when the first and second attachment members 18 and 30 are drawn toward one another when the fastener 28 is tightened.

It is advantageous to design segments 12 and 14 as reverse mirror images of one another with respect to their attachment member interfaces including faces 22 and 34, shrouds 40 and 48 and recesses 42 and 50 so that only one type of segment needs to be manufactured. This is ensured by having the second shroud 48 positioned on an opposite side of the second attachment member 30 from the first recess 42 and positioning the second recess 50 on an opposite side of the first attachment member 18 from the first shroud 40. It is further advantageous to use indicia on the segments 12 and 14 which direct attention to inspection points which may be used to visually confirm when a satisfactory joint has been achieved. By way of example, FIG. 1 shows a first index mark 52 positioned on the first attachment member 18 and a second index mark 54 positioned on the second attachment member 30. As shown in FIG. 4, the first and second index marks 52 and 54 align with one another when the first and second segments 12 and 14 are drawn together and point to a position where the first and second faces 22 and 34 on respective attachment members 18 and 30 contact one another when a satisfactory joint has been achieved. If the faces 22 and 34 are not in contact at the point indicated by index marks 52 and 54 the coupling has not been properly installed. As shown in FIG. 3, it is convenient to position index marks 52 and 54 on both sides of both attachment members 18 and 30 in case one of the sides of the coupling 10 is not conveniently visible when installed. Index marks 52 and 54 are integrally cast with the segments 12 and 14, although other forms of index marks, such as machined markings or decals are also feasible.

To aid in proper inspection of the installed coupling and avoid distracting false indicators of a satisfactory joint, the engagement between the shrouds 40 and 48 and their respective receiving recesses 42 and 50 blocks the line of sight toward the central space 16, where visible gaps between the segments, often highlighted by a color contrast between the segments and a seal for example, have been traditionally used as indicators, albeit in some cases insufficient indicators, of a satisfactory joint (see FIG. 4).

As shown in FIGS. 1 and 4, example coupling 10 comprises a hinge 56 positioned at respective second ends 58 and 60 of the first and second segments 12 and 14. The first and second segments 12 and 14 pivot about the hinge 56 when they are drawn toward one another as shown in a comparison of FIGS. 1 and 4. Although many hinge types are feasible, in this embodiment the hinge 56 comprises a first boss 62 projecting from the second end 58 of the first segment 12. A second boss 64 projects from the second end 60 of the second segment 14 and is positioned adjacent to the first boss 62. First and second fulcrums 66 and 68 are respectively positioned on the first and second bosses 62 and 64. The fulcrums contact one another to permit the segments 12 and 14 to pivot as shown in FIGS. 1 and 4. Fulcrums 66 and 68 may be at least partially defined by respective first and second lands 70 and 72. First land 70 is positioned contiguous with the first fulcrum 66 on the first boss 62 and second land 72 is positioned contiguous with the second fulcrum 68 on the second boss 64. The first and second lands 70 and 72 are oriented angularly with respect to the first and second faces 22 and 34 of the first and second segments 12 and 14 whose intersection defines the interface between the segments.

Example hinge 56 further comprises a first head 74 projecting from the first boss 62 and a second head 76 projecting from the second boss 64. Heads 74 and 76 engage and retain a link 78 to the bosses 62 and 64 which holds the segments 12 and 14 together. In this example the link 78 comprises a ring 80 encircling the first and second bosses.

As shown in FIG. 2, the example coupling 10 according to the invention may further comprise a first tooth 82 positioned at the first end 20 of the first segment 12. As shown in FIG. 3, the first tooth 82 projects toward the second segment 14 and is received within a first socket 84 positioned at the first end 32 of the second segment 14. The first socket 84 receives the first tooth 82 when the first and second segments 12 and 14 are drawn toward one another. A second tooth 86 may also be positioned at the first end 32 of the second segment 14. The second tooth 86 projects toward the first segment 12 and is received within a second socket 88 (see FIG. 2) positioned at the first end 20 of the first segment 12. The second socket 88 receives the second tooth 86 when the first and second segments 12 and 14 are drawn toward one another. Engagement between the teeth 82 and 86 and their respective receiving sockets 84 and 88 strengthens the joint formed by the coupling 10. As with the shrouds and their receiving recesses, the teeth and sockets of the first and second segments 12 and 14 are positioned as reversed mirror images of one another.

As shown in FIG. 2, when coupling 10 is used with grooved end pipe elements, each of the first and second segments comprises first and second arcuate projections 90 and 92 on opposite sides of each segment 12 and 14 (12 shown). Each arcuate projection 90, 92 extends between the first (20, 32) and second (58, 60) ends of the segments 12 and 14. Each arcuate projection is engageable with one of the pipe elements when the first and second segments are drawn toward one another. As shown in FIG. 1, a seal 94 is positioned between the segments 12 and 14. In this example embodiment the seal comprises a ring 96. Advantageously, the ring 96 may be used to support the first and second segments 12 and 14 in spaced relation sufficient to permit insertion of the pipe elements into the central space 16. This is known as the "factory assembled" configuration (see FIG.

1), the coupling 10 being supplied to the end user in this configuration, ready for installation without the need to disassemble and then reassemble the coupling. The installer merely inserts the pipe elements into the central space 16 and then tightens the fastener 28. A proper joint is confirmed by inspection of the contacting faces 22 and 34 at the index marks 52 and 54 (see FIG. 4).

Figure 5:
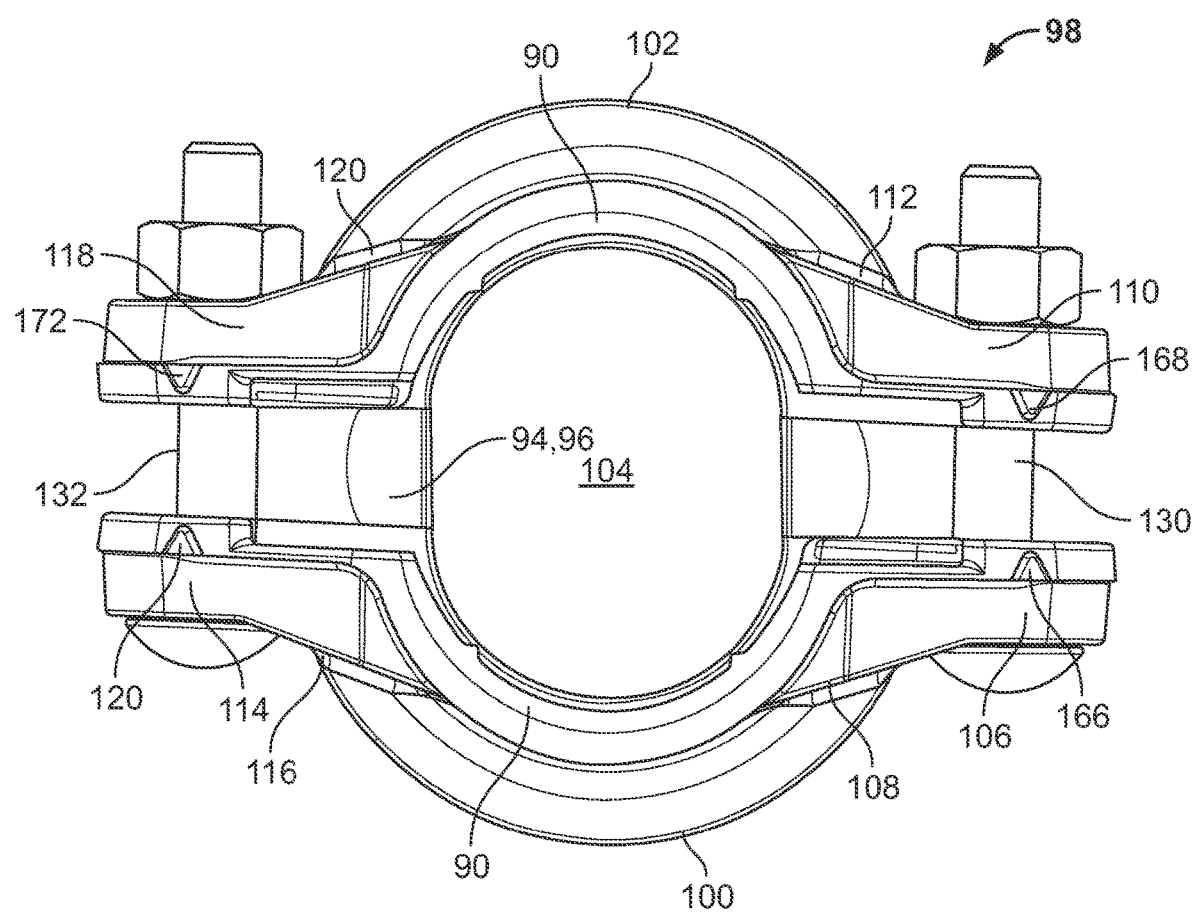
FIG. 5 is a side view of another example embodiment of a coupling according to the invention shown in a factory assembled configuration.
Figure 6:
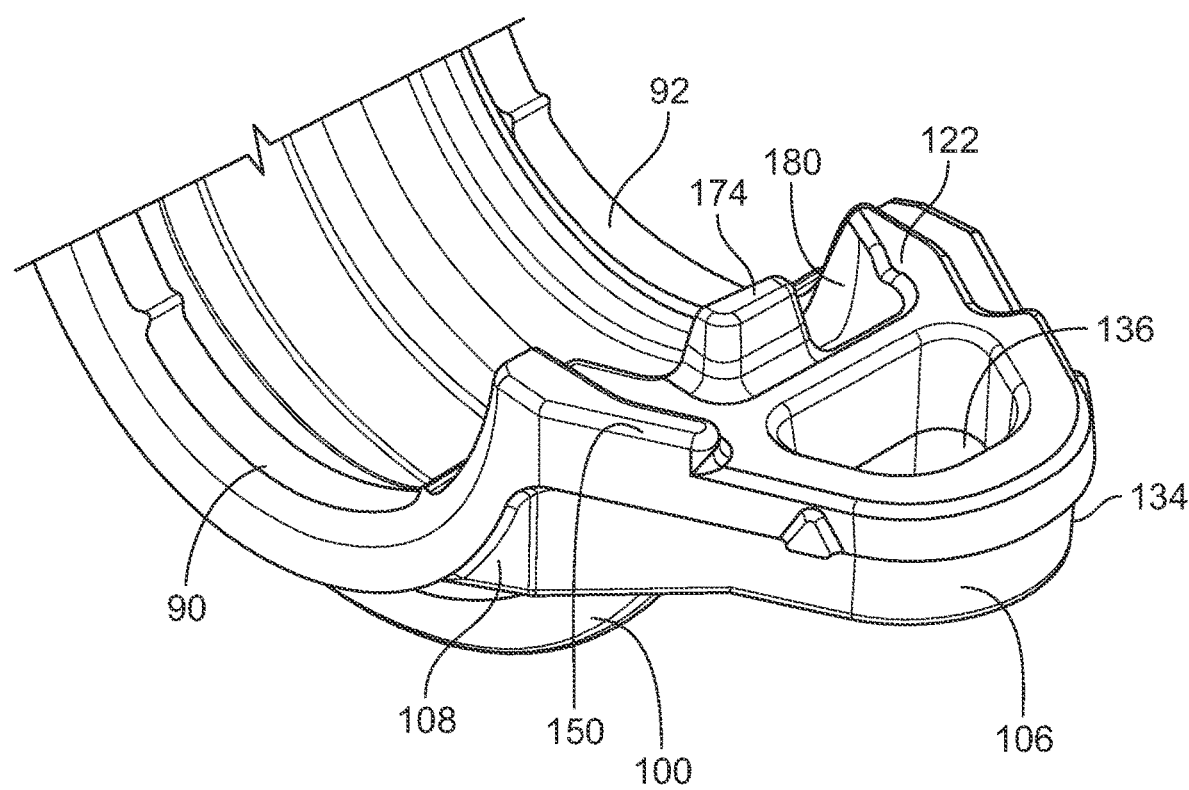
FIG. 6 is an isometric view of a component of the coupling shown in FIG. 5.
Figure 7:
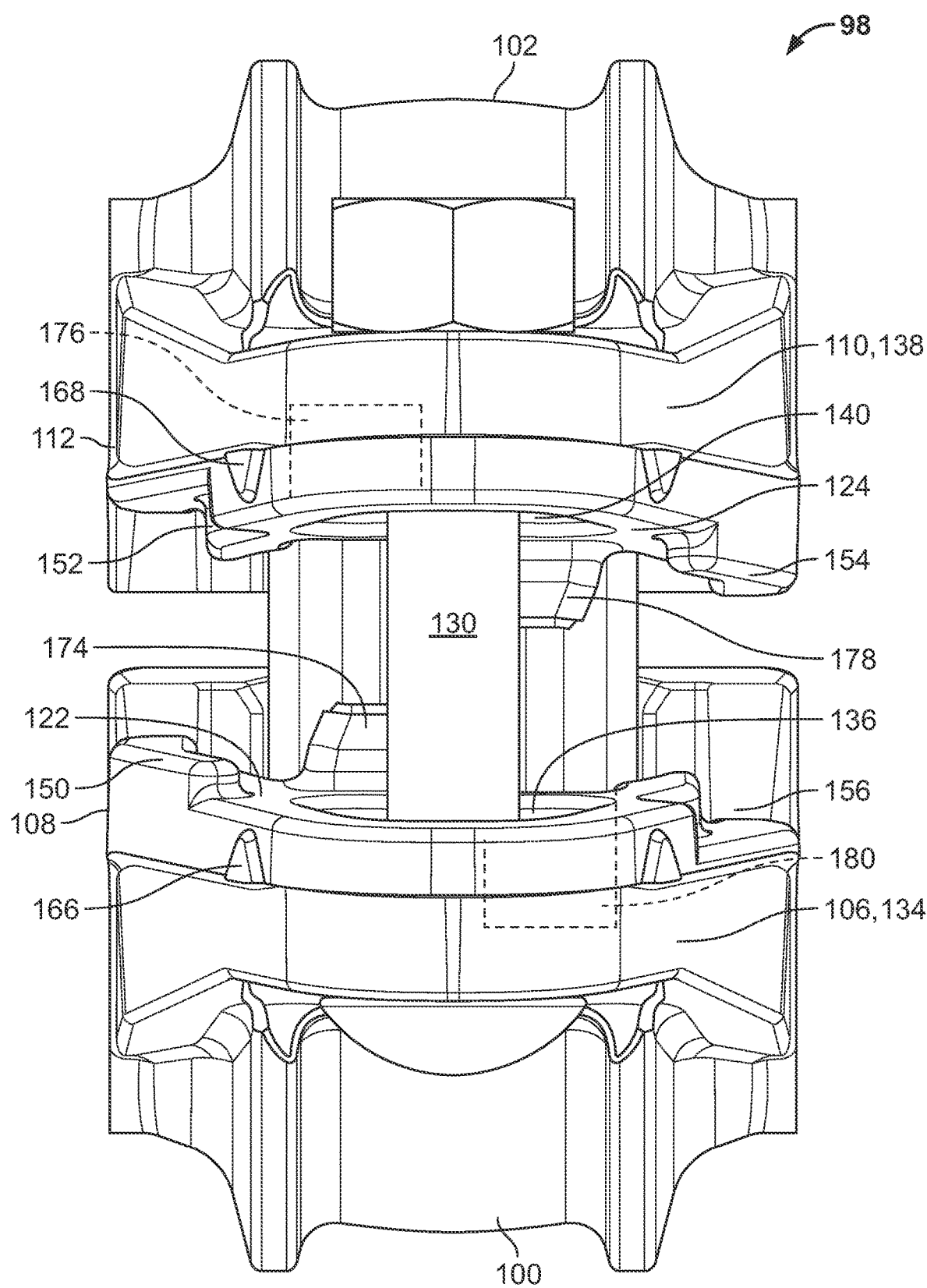
FIG. 7 is an end view of the coupling shown in FIG. 5.
Figure 8:
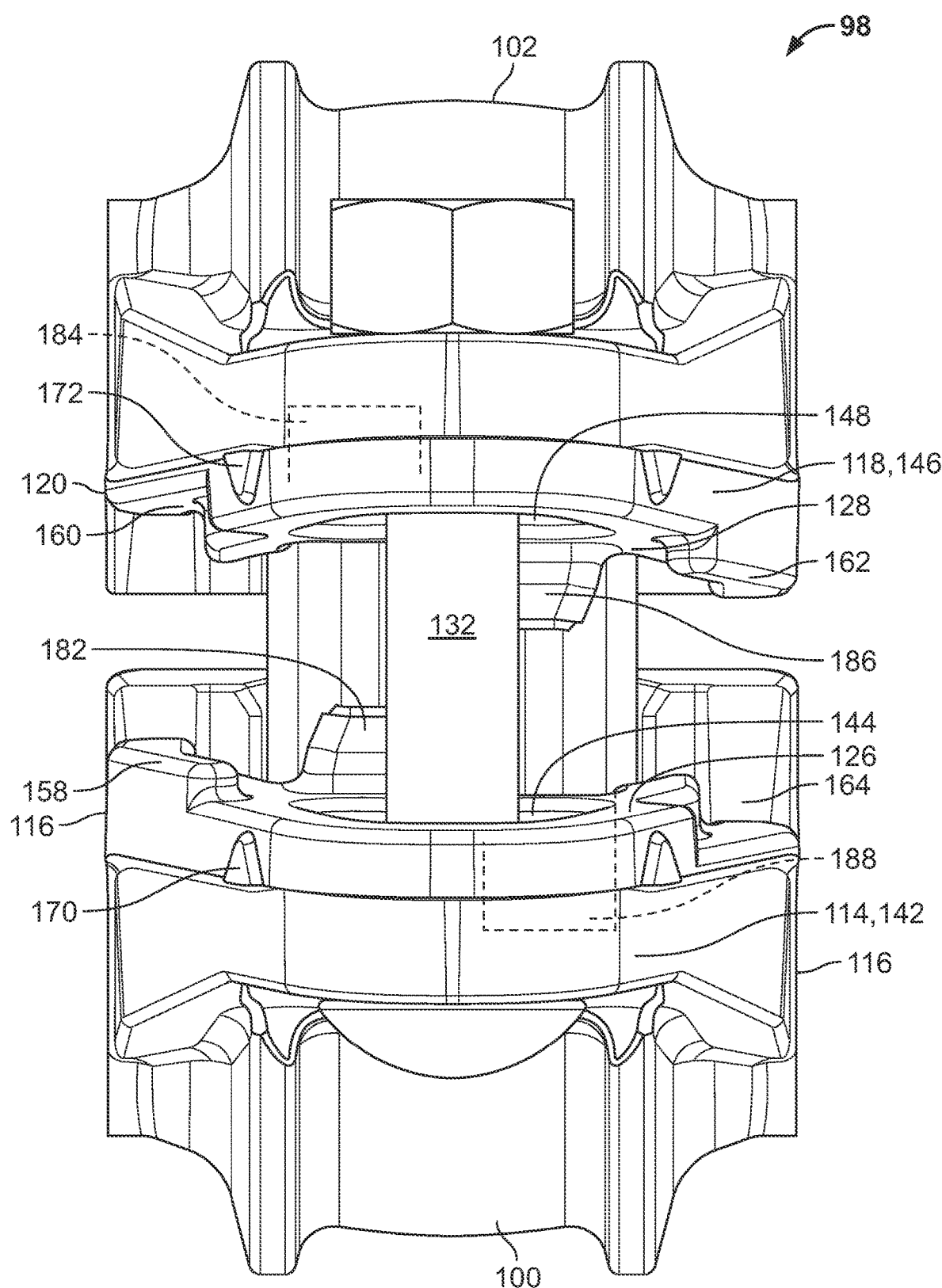
FIG. 8 is an end view of the coupling shown in FIG. 5 showing the end opposite from that of FIG. 7.

FIG. 5 shows another example coupling embodiment 98 according to the invention for joining pipe elements. Coupling 98 comprises first and second segments 100, 102, attached to one another end to end surrounding a central space 104 for receiving the pipe elements (not shown). A first attachment member 106 extends from a first end 108 of the first segment 100; a second attachment member 110 extends from a first end 112 of the second segment 102, a third attachment member 114 extends from a second end 116 of the first segment 100 and a fourth attachment member 118 extends from a second end 120 of the second segment 102. Each attachment member defines a face. As shown by way of example in FIG. 6, the first attachment member 106 defines a first face 122. As shown in FIG. 7, the second attachment member 110 defines a second face 124. The first and second faces 122 and 124 are in facing relation. FIG. 8 shows the third attachment member 114 which defines a third face 126, and the fourth attachment member 118 which defines a fourth face 128. The third and fourth faces 126 and 128 are in facing relation. As shown in FIG. 5, first and second fasteners 130 and 132 join the segments 100 and 102 via the attachment members at opposite ends of each segment. As shown in FIG. 6, the first attachment member 106 comprises a first lug 134 which defines a first hole 136 for receiving the first fastener 130. FIG. 7 shows the second attachment member 110 which comprises a second lug 138 defining a second hole 140 which also receives the first fastener 130. As shown in FIG. 8, the third attachment member 114 comprises a third lug 142 which defines a third hole 144 and the fourth attachment member 118 comprises a fourth lug 146 defining a fourth hole 148. The third and fourth holes receive the second fastener 132. Faces 122, 124, 126 and 128 on the first and second segments 100 and 102 have portions which surround the hole defined by the lug on which the face resides. An example of this configuration is shown in FIG. 6 wherein a portion of the first face 122 surrounds the first hole 136 defined by the first lug 134 at the first end 112 of the first segment 100. The second, third and fourth faces 124, 126 and 128 on the second, third and fourth lugs 138, 142 and 146 are similarly arranged.

Figure 9:
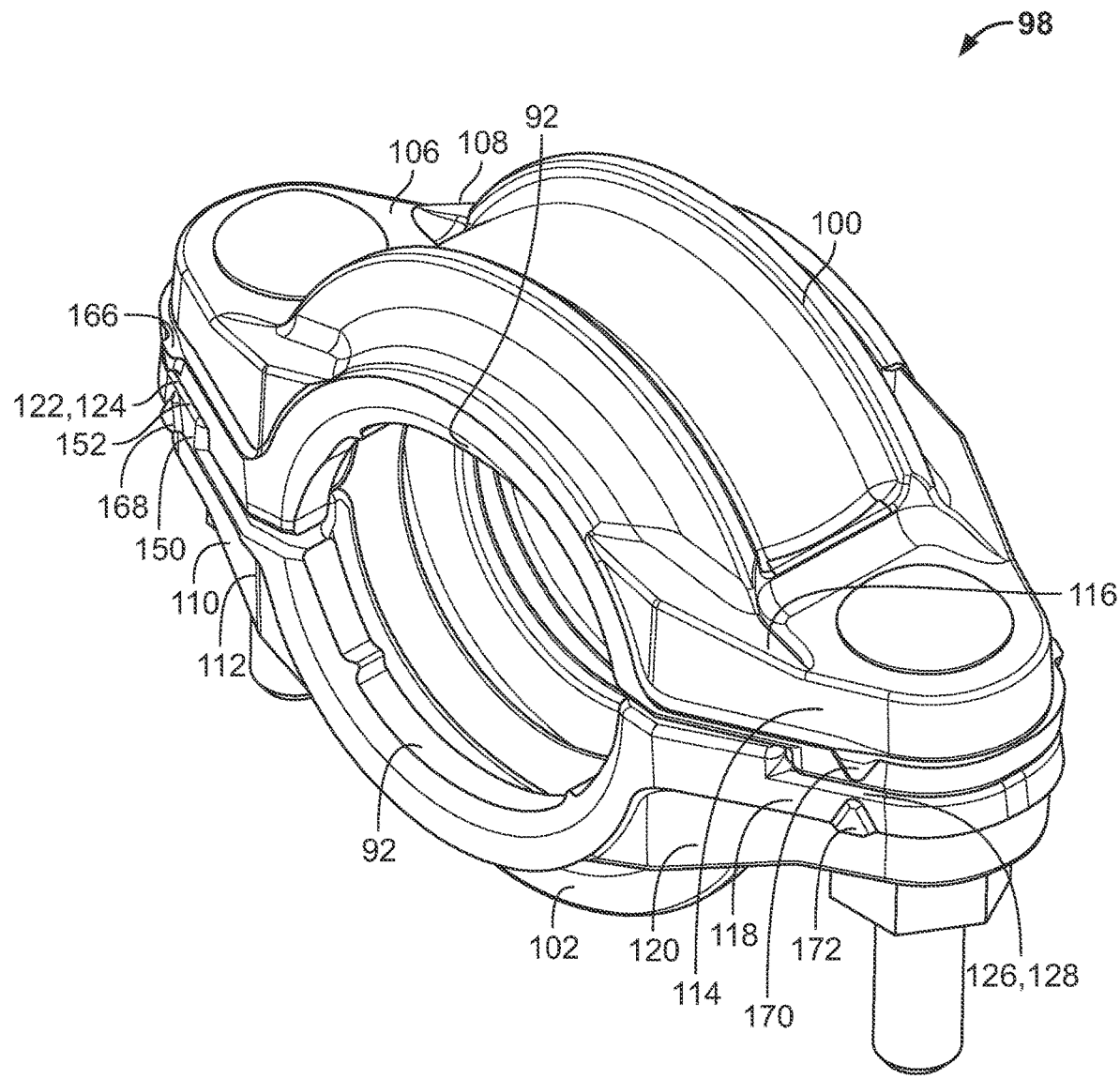
FIG. 9 is an isometric view of the coupling shown in FIG. 5 as it would appear when engaging pipe elements (not shown).

As shown in FIG. 6, a first shroud 150 is positioned on the first attachment member 106. First shroud 150 extends along at least a portion of the first face 122 and, as shown in FIG. 7, projects toward the second attachment member 110. A first recess 152 is positioned on the second attachment member 110 and extends along at least a portion of the second face 124. First recess 152 receives the first shroud 150 when the first and second attachment members 106 and 110 are drawn toward one another as shown in FIG. 9. As further shown in FIG. 7, a second shroud 154 is positioned on the second attachment member 110 and extends along at least a portion of the second face 124. The second shroud 154 projects toward the first attachment member 106 and is received within a second recess 156 positioned on the first attachment member 106. Second recess 156 extends along at least a portion of the first face 122.

As shown in FIG. 8, a third shroud 158 is positioned on the third attachment member 114. Third shroud 158 extends along at least a portion of the third face 126 and projects toward the fourth attachment member 118. A third recess 160 is positioned on the fourth attachment member 118 and extends along at least a portion of the fourth face 128. Third recess 160 receives the third shroud 158 when the third and fourth attachment members 114 and 118 are drawn toward one another. As further shown in FIG. 8, a fourth shroud 162 is positioned on the fourth attachment member 118 and extends along at least a portion of the fourth face 128. The fourth shroud 162 projects toward the third attachment member 114 and is received within a fourth recess 164 positioned on the third attachment member 114. Fourth recess 164 extends along at least a portion of the third face 126.

It is advantageous to design segments 100 and 102 as reverse mirror images of one another with respect to their attachment member interfaces including faces 122, 124, 126 and 128, shrouds 150, 154, 158 and 162 and recesses 152, 156, 160 and 164 so that only one type of segment needs to be manufactured. This is ensured by having the second shroud 154 positioned on an opposite side of the second attachment member 110 from the first recess 152 and positioning the second recess 156 on an opposite side of the first attachment member 106 from the first shroud 150. Likewise, the third shroud 158 is positioned on an opposite side of the third attachment member 114 from the fourth recess 164 and the fourth shroud 162 is positioned on an opposite side of the fourth attachment member 118 from the third recess 160.

It is further advantageous to use indicia on the segments 100 and 102 which direct attention to inspection points which may be used to visually confirm when a satisfactory joint has been achieved. By way of example, FIGS. 7 and 8 show a first index mark 166 is positioned on the first attachment member 106, a second index mark 168 is positioned on the second attachment member 110, a third index mark 170 is positioned on the third attachment member 114 and a fourth index mark 172 is positioned on the fourth attachment member 118. As shown in FIG. 9, the index marks 166 and 168 align with one another when the first and second segments 100 and 102 are drawn together and point to a position where the first and second faces 122 and 124 on respective attachment members 106 and 110 contact one another when a satisfactory joint has been achieved. FIG. 9 also shows the third and fourth index marks 170 and 172 aligning with one another when the first and second segments 100 and 102 are drawn together. Index marks 170 and 172 point to a position where the third and fourth faces 126 and 128 on respective attachment members 114 and 118 contact one another when a satisfactory joint has been achieved. If the faces 122 and 124 are not in contact at the point indicated by index marks 166 and 168, and if the faces 126 and 128 are not in contact at the point indicated by index marks 170 and 172, then the coupling 98 has not been properly installed. As shown in FIGS. 7 and 8, it is convenient to position index marks 166, 168, 170 and 172 on both sides of the attachment members 106, 110, 114 and 118 in case one of the sides of the coupling 98 is not conveniently visible when installed. Index marks 166, 168. 170 and 172 are integrally cast with the segments 100 and 102, although other forms of index marks, such as machined markings or decals are also feasible.

To aid in proper inspection of the installed coupling and avoid distracting false indicators of a satisfactory joint, the engagement between the shrouds 150, 154, 158 and 162 and their respective receiving recesses 152, 156, 160 and 164 blocks the line of sight toward the central space 104, where visible gaps between the segments, often highlighted by a color contrast between the segments and a seal for example, have been traditionally used as indicators, albeit in many cases false indicators, of a satisfactory joint.

As shown in FIG. 6, a first tooth 174 is positioned at the first end 108 of the first segment 100. As shown in FIG. 7, the first tooth 174, when present, projects toward the second segment 102 where it is received within a first socket 176 positioned at the first end 112 of the second segment 102. The first socket 176 receives the first tooth 174 when the first and second segments 100, 102 are drawn toward one another. As further shown in FIG. 7, a second tooth 178 may be positioned at the first end 112 of the second segment 102. The second tooth 178, when present, projects toward the first segment 100 and is received within a second socket 180 positioned at the first end 108 of the first segment 100 (see also FIG. 6). The second socket 180 receives the second tooth 178 when the first and second segments 100, 102 are drawn toward one another.

As shown in FIG. 8, a third tooth 182 may be positioned at the second end 116 of the first segment 100. The third tooth 182 projects toward the second segment 102 where it is received within a third socket 184 positioned at the second end 120 of the second segment 102. The third socket 184 receives the third tooth 182 when the first and second segments 100, 102 are drawn toward one another. As further shown in FIG. 8, a fourth tooth 186 may be positioned at the second end 120 of the second segment 102. The fourth tooth 186 projects toward the first segment 100 and is received within a fourth socket 188 positioned at the second end 116 of the first segment 100. The fourth socket 188 receives the fourth tooth 186 when the first and second segments 100, 102 are drawn toward one another.

Engagement between the teeth 174, 178, 182 and 186 and their respective receiving sockets 176, 180, 184 and 188 strengthens the joint formed by the coupling 98. As with the shrouds and their receiving recesses, the teeth and sockets of the first and second segments 100 and 102 are positioned as reversed mirror images of one another.

As shown in FIG. 6, when coupling 98 is used with grooved end pipe elements, each of the first and second segments comprises first and second arcuate projections 90 and 92 on opposite sides of each segment 100 and 102 (100 shown). As shown in FIGS. 5 and 9, each arcuate projection 90, 92 extends between the first (108, 112) and second (116, 120) ends of the segments 100 and 102. Each arcuate projection is engageable with one of the pipe elements (not shown) when the first and second segments are drawn toward one another. As shown in FIG. 5, a seal 94 is positioned between the segments 100 and 102. In this example embodiment the seal comprises a ring 96. Advantageously, the ring 96 may be used to support the first and second segments 100 and 102 in spaced relation sufficient to permit insertion of the pipe elements into the central space 104. This is known as the "factory assembled" configuration, the coupling 98 being supplied to the end user in this configuration, ready for installation without the need to disassemble and then reassemble the coupling. The installer merely inserts the pipe elements into the central space 104 and then tightens the fasteners 130 and 132. A proper joint is confirmed by inspection of the contacting faces 122, 124, 126 and 128 at the index marks 166, 168, 170 and 172.

It is expected that couplings 10 and 98 according to the invention will improve the installation of mechanical pipe couplings.

What is claimed is:

1. A coupling for joining pipe elements in end to end relation, said coupling comprising:

first and second segments attached to one another end to end surrounding a central space for receiving said pipe elements;

a first attachment member extending from a first end of said first segment, said first attachment member defining a first face;

a second attachment member extending from a first end of said second segment, said second attachment member defining a second face, said first and second faces being in facing relation;

a first shroud positioned along a first outwardly facing side surface of said first attachment member and extending along at least a portion of said first face, said first shroud projecting toward said second attachment member;

a first recess positioned along a first outwardly facing side surface of said second attachment member and extending along at least a portion of said second face, said first recess receiving said first shroud when said first and second attachment members are drawn toward one another; and an adjustable first fastener extending between said first and second attachment members for drawing said first and second attachment members toward one another; wherein said first attachment member comprises a first lug defining a first hole for receiving said first fastener, said second attachment member comprises a second lug defining a second hole for receiving said first fastener, and a portion of said first face surrounds said first hole and a portion of said second face surrounds said second hole.

2. The coupling according to claim 1, further comprising:

a second shroud positioned on said second attachment member and extending along at least a portion of said second face, said second shroud projecting toward said first attachment member;

a second recess positioned on said first attachment member and extending along at least a portion of said first face, said second recess receiving said second shroud when said first and second attachment members are drawn toward one another.

3. The coupling according to claim 2, wherein:

said second shroud is positioned on an opposite side of said second attachment member from said first recess; and said second recess is positioned on an opposite side of said first attachment member from said first shroud.

4. The coupling according to claim 3, further comprising:

a third attachment member extending from a second end of said first segment, said third attachment member defining a third face;

a fourth attachment member extending from a second end of said second segment, said fourth attachment member defining a fourth face, said third and fourth faces being in facing relation;

a third shroud positioned on said third attachment member and extending along at least a portion of said third face, said third shroud projecting toward said fourth attachment member;

a third recess positioned on said fourth attachment member and extending along at least a portion of said fourth face, said third recess receiving said third shroud when said third and fourth attachment members are drawn toward one another; and an adjustable second fastener extending between said third and fourth attachment members for drawing said third and fourth attachment members toward one another.

5. The coupling according to claim 4, further comprising:
a fourth shroud positioned on said fourth attachment member and extending along at least a portion of said fourth face, said fourth shroud projecting toward said third attachment member;
a fourth recess positioned on said third attachment member and extending along at least a portion of said third face, said fourth recess receiving said fourth shroud when said third and fourth attachment members are drawn toward one another.

6. The coupling according to claim 5, wherein:
said third shroud is positioned on an opposite side of said third attachment member from said fourth recess; and
said fourth shroud is positioned on an opposite side of said fourth attachment member from said third recess.

7. The coupling according to claim 4, wherein:
said first attachment member comprises a first lug defining a first hole for receiving said first fastener;
said second attachment member comprises a second lug defining a second hole for receiving said first fastener;
said third attachment member comprises a third lug defining a third hole for receiving said second fastener;
said fourth attachment member comprises a fourth lug defining a fourth hole for receiving said second fastener.

8. The coupling according to claim 7, wherein a portion of said first face surrounds said first hole, a portion of said second face surrounds said second hole, a portion of said third face surrounds said third hole and a portion of said face surrounds said fourth hole.

9. The coupling according to claim 4, further comprising:
a first index mark positioned on said first attachment member;
a second index mark positioned on said second attachment member;
a third index mark positioned on said third attachment member;
a fourth index mark positioned on said fourth attachment member; wherein
said first and second index marks align with one another, and said third and fourth index marks align with one another when said first and second segments are drawn toward one another.

10. The coupling according to claim 9, wherein said first, second, third and fourth index marks are integrally formed with said first, second, third and fourth attachment members respectively.

11. The coupling according to claim 1, further comprising a hinge positioned at a second end of each of said first and second segments, said first and second segments pivoting about said hinge when said first and second segments are drawn toward one another.

12. The coupling according to claim 11, further comprising:
a second shroud positioned on said second attachment member and extending along at least a portion of said second face, said second shroud projecting toward said first attachment member;
a second recess positioned on said first attachment member and extending along at least a portion of said first face, said second recess receiving said second shroud when said first and second attachment members are drawn toward one another.

13. The coupling according to claim 12, wherein:
said second shroud is positioned on an opposite side of said second attachment member from said first recess; and
said second recess is positioned on an opposite side of said first attachment member from said first shroud.

14. The coupling according to claim 11, wherein said hinge comprises:
a first boss projecting from said second end of said first segment;
a second boss projecting from said second end of said second segment and positioned adjacent to said first boss;
a first fulcrum positioned on said first boss and contacting said second boss, said segments pivoting about said first fulcrum;
a link extending between and capturing said first and second bosses.

15. The coupling according to claim 14, further comprising a second fulcrum positioned on said second boss, said second fulcrum contacting said first fulcrum.

16. The coupling according to claim 15, further comprising:
a first land positioned contiguous with said first fulcrum on said first boss;
a second land positioned contiguous with said second fulcrum on said second boss, said first and second lands being oriented angularly with respect to a plane defining an interface between said first and second segments.

17. The coupling according to claim 15, further comprising:
a first head projecting from said first boss;
a second head projecting from said second boss, said link engaging said first and second heads for retaining said link to said bosses.

18. The coupling according to claim 17, wherein said link comprises a ring encircling said first and second bosses.

19. The coupling according to claim 1, further comprising:
a first index mark positioned on said first attachment member;
a second index mark positioned on said second attachment member; wherein
said first and second index marks align with one another when said first and second segments are drawn toward one another.

20. The coupling according to claim 19, wherein said first and second index marks are integrally formed with said first and second attachment members respectively.

21. The coupling according to claim 1, further comprising:
a first tooth positioned at said first end of said first segment, said first tooth projecting toward said second segment;
a first socket positioned at said first end of said second segment, said first socket receiving said first tooth when said first and second segments are drawn toward one another.

22. The coupling according to claim 21, further comprising:
a second tooth positioned at said first end of said second segment, said second tooth projecting toward said first segment;

a second socket positioned at said first end of said first segment, said second socket receiving said second tooth when said first and second segments are drawn toward one another.

23. The coupling according to claim 1, wherein each said first and second segments comprises first and second arcuate projections on opposite sides of each said segment, each said arcuate projection extending between said first and second ends of said segments, each said arcuate projection being engageable with one of said pipe elements when said first and second segments are drawn toward one another.

24. The coupling according to claim 1, further comprising a seal positioned between said segments.

25. The coupling according to claim 24, wherein said seal comprises a ring, said ring supporting said first and second segments in space relation sufficient to insert said pipe elements into said central space.

26. The coupling according to claim 1, wherein said first fastener comprises a threaded bolt and nut.

27. A coupling for joining pipe elements in end to end relation, said coupling comprising:
   first and second segments attached to one another end to end surrounding a central space for receiving said pipe elements;
   a first attachment member extending from a first end of said first segment, said first attachment member defining a first face;
   a second attachment member extending from a first end of said second segment, said second attachment member defining a second face, said first and second faces being in facing relation;
   a first shroud positioned along a first outwardly facing side surface of said first attachment member and extending along at least a portion of said first face, said first shroud projecting toward said second attachment member;
   a first recess positioned along a first outwardly facing side surface of said second attachment member and extending along at least a portion of said second face, said first recess receiving said first shroud when said first and second attachment members are drawn toward one another;
   an adjustable first fastener extending between said first and second attachment members for drawing said first and second attachment members toward one another; and
   a hinge positioned at a second end of each of said first and second segments, said first and second segments pivoting about said hinge when said first and second segments are drawn toward one another;
   wherein said hinge comprises:
      a first boss projecting from said second end of said first segment,
      a second boss projecting from said second end of said second segment and positioned adjacent to said first boss,
      a first fulcrum positioned on said first boss and contacting said second boss, said segments pivoting about said first fulcrum, and
      a link extending between and capturing said first and second bosses.

28. A coupling for joining pipe elements in end to end relation, said coupling comprising:
   first and second segments attached to one another end to end surrounding a central space for receiving said pipe elements;
   a first attachment member extending from a first end of said first segment, said first attachment member defining a first face;
   a second attachment member extending from a first end of said second segment, said second attachment member defining a second face, said first and second faces being in facing relation;
   a first shroud positioned along a first outwardly facing side surface of said first attachment member and extending along at least a portion of said first face, said first shroud projecting toward said second attachment member;
   a first recess positioned along a first outwardly facing side surface of said second attachment member and extending along at least a portion of said second face, said first recess receiving said first shroud when said first and second attachment members are drawn toward one another;
   an adjustable first fastener extending between said first and second attachment members for drawing said first and second attachment members toward one another;
   a first index mark positioned on said first attachment member; and
   a second index mark positioned on said second attachment member; wherein
   said first and second index marks align with one another when said first and second segments are drawn toward one another.

29. A coupling for joining pipe elements in end to end relation, said coupling comprising:
   first and second segments attached to one another end to end surrounding a central space for receiving said pipe elements;
   a first attachment member extending from a first end of said first segment, said first attachment member defining a first face;
   a second attachment member extending from a first end of said second segment, said second attachment member defining a second face, said first and second faces being in facing relation;
   a first shroud positioned along a first outwardly facing side surface of said first attachment member and extending along at least a portion of said first face, said first shroud projecting toward said second attachment member;
   a first recess positioned along a first outwardly facing side surface of said second attachment member and extending along at least a portion of said second face, said first recess receiving said first shroud when said first and second attachment members are drawn toward one another;
   an adjustable first fastener extending between said first and second attachment members for drawing said first and second attachment members toward one another;
   a first tooth positioned at said first end of said first segment, said first tooth projecting toward said second segment; and
   a first socket positioned at said first end of said second segment, said first socket receiving said first tooth when said first and second segments are drawn toward one another.

* * * * *